United States Patent
Zimmer (10) Patent No.: US 6,782,580 B1
(45) Date of Patent: Aug. 31, 2004

(54) VEHICLE WIPER SYSTEM AND A METHOD FOR OPERATING A WIPER ARM LINKAGE

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 351 days.

(21) Appl. No.: 09/868,143

(22) PCT Filed: Oct. 18, 2000

(86) PCT No.: PCT/DE00/03655

§ 371 (c)(1),
(2), (4) Date: Jun. 15, 2001

(87) PCT Pub. No.: WO01/30617

PCT Pub. Date: May 3, 2001

(30) Foreign Application Priority Data

Oct. 21, 1999 (DE) .......................................... 199 50 740

(51) Int. Cl.[7] .............................. B60S 1/32; B60S 1/06; B60S 1/24
(52) U.S. Cl. ............................... 15/250.21; 15/250.23; 15/250.13; 15/250.31; 15/250.351
(58) Field of Search ......................... 15/250.21, 250.23, 15/250.13, 250.14, 250.351, 250.3, 250.31

(56) References Cited

U.S. PATENT DOCUMENTS

| | | | |
|---|---|---|---|
| 4,720,885 A | * | 1/1988 | Leroy et al. .............. 15/250.21 |
| 5,920,948 A | * | 7/1999 | Hayashi et al. .......... 15/250.21 |
| 6,634,054 B2 | * | 10/2003 | Kuehbauch ............... 15/250.21 |

FOREIGN PATENT DOCUMENTS

DE 3734201 A1 * 4/1989 ............. B60S/1/24

* cited by examiner

Primary Examiner—Robert J. Warden, Sr.
Assistant Examiner—S Balsis
(74) Attorney, Agent, or Firm—Michael J. Striker

(57) ABSTRACT

A wiper system (1) for vehicles, having at least one wiper lever linkage (3) that has at least one wiper arm (35), and a method for operating the wiper lever linkage (3), are proposed. The wiper lever linkage has a first pivot lever (5), which can be coupled to a stationary first shaft (21) in a manner fixed against relative rotation, and a second pivot lever (7) that can be coupled to a stationary second shaft (29) in a manner fixed against relative rotation, the pivot levers being connected in articulated fashion to a coupling element (9). The wiper system (1) is distinguished in that the coupling element (9) is embodied in multiple parts and has a first coupling part (11) and a second coupling part (13), which are coupled to one another with the aid of a joint (15).

9 Claims, 5 Drawing Sheets

VEHICLE WIPER SYSTEM AND A METHOD FOR OPERATING A WIPER ARM LINKAGE

BACKGROUND OF THE INVENTION

The invention relates to a wiper system for vehicles as generically defined and to a method for operating a wiper lever linkage of a wiper system for vehicles.

A known wiper system has a pivot lever that can be pivoted freely about a stationary shaft, and a wiper arm provided with a wiper element is secured to the pivot lever. Because of this design, the wiper arm takes a circular path, which means only a small swept field, which in many cases does not meet requirements.

A wiper system is also known that has a four-bar wiper lever linkage which includes first and second pivot levers that are each coupled in a manner fixed against relative rotation to a stationary shaft and connected in articulated fashion to a coupling element. A wiper arm provided with a wiping element is secured to the coupling element and upon pivoting of the pivot lever executes a reciprocating-pivoting motion, which leads to an enlargement of the swept field. A disadvantage in the known wiper system is the large installation space required for the wiper lever linkage, space that if the wiper system is to be used to clean a windshield of a motor vehicle must be made available in the region of the front end of the vehicle. However, there is little space in the front-end region of the motor vehicle, and in future vehicles there will be even less, since the proportion of the length of the interior to the total length of the motor vehicle is becoming greater and greater. It is also found that the swept field of the four-bar wiper lever linkage is not large enough to meet legal requirements, or increasing demands for comfort and safety, given the large window surfaces planned for vehicles in the future in particular.

SUMMARY OF THE INVENTION

The wiper system of the invention has the advantage over the prior art that for the same installation space, a markedly longer stroke and thus a larger swept field can be achieved with the wiper lever linkage than in the known wiper system with the four-bar wiper lever linkage. It is understood that it is also possible to design a wiper lever linkage that, for at least essentially the same-sized swept field or essentially the same feasible stroke length in the known four-bar wiper lever linkage, has a smaller installation space. To achieve a large swept field with a compact design of the wiper lever linkage, it is provided in the wiper system of the invention that the coupling element is embodied in multiple parts and has a first coupling part and a second coupling part, which are coupled to one another with the aid of a joint. A five-bar wiper lever linkage is thus created in which an exact control of the stroke is possible.

In an especially advantageous exemplary embodiment of the wiper system, the wiper lever linkage is assigned a drive device, which has first and second drive cranks, of which the first drive crank is coupled in a manner fixed against relative rotation to the first shaft, to which the first pivot lever is also secured, and the second drive crank is coupled in a manner fixed against relative rotation to the second shaft, on which the second is retained. In other words, the first and second shafts can each be subjected to a driving or braking moment that is transmitted via the pivot levers to the wiper lever linkage.

In an advantageous variant embodiment, the first and second drive cranks are connected to one another in articulated fashion with the aid of a coupling member. As a result, the motions of the first and second drive cranks and thus also of the first and second pivot levers are dependent on one another, and hence the degree of freedom of the wiper lever linkage, provided by the additional joint between the first coupling part and the second coupling part, is balanced or compensated for. To adapt the motions of the two drive cranks to one another, in another variant embodiment the first and second drive cranks are each connected in articulated fashion to an engine crank, and the engine cranks in turn are coupled to one another in such a way that their oscillating motions are adapted exactly to one another. In both variant embodiments, for controlling the pivoting motion of the drive cranks and thus also of the first and second pivot levers, the pivot angle of the second drive crank is adjustable freely, independently of the multi-part coupling element that connects the pivot levers to one another, since the first and second coupling parts of the coupling element are connected to one another in articulated fashion, thus providing one additional degree of freedom for the polygonal joint. Adjusting the pivot angle of the second drive crank can be done for instance by changing the length of the coupling member.

Further advantageous features of the wiper system will become apparent from the other dependent claims.

The subject of the invention also pertains to a method for driving a wiper lever linkage of a wiper system for vehicles, having the characteristics of claim 8, in which it is provided that the first and second drive cranks, during one wiping cycle, are pivoted out of an outset position of the wiper lever linkage in the same direction until they reach an extended position, in which the coupling member, which can for instance be in rod form, and the first drive crank are aligned with one another. In the further course of the wiping cycle, in which the wiper lever linkage is displaced out of the extended position to a turning point position, the first drive crank is pivoted onward in the same direction and the second drive crank is pivoted onward in the opposite direction. To optimize the course of motion of the wiper lever linkage, it is designed such that during one wiping cycle, the first drive crank has two turning positions and the second drive crank has three turning positions, in each of which a reversal of the pivoting direction takes place.

Further advantageous embodiments of the method will become apparent from the other dependent claims.

BRIEF DESCRIPTION OF THE DRAWINGS

The invention will be described in further detail below in conjunction with the drawing. Shown are.

DESCRIPTION OF THE PREFERRED EMBODIMENTS

The wiper system 1 described below can be widely used, for instance for motor vehicles (passenger cars, trucks, buses), rail cars, or watercraft. Purely as an example, it will be assumed below that it is a wiper system for a motor vehicle.

Figure 1:
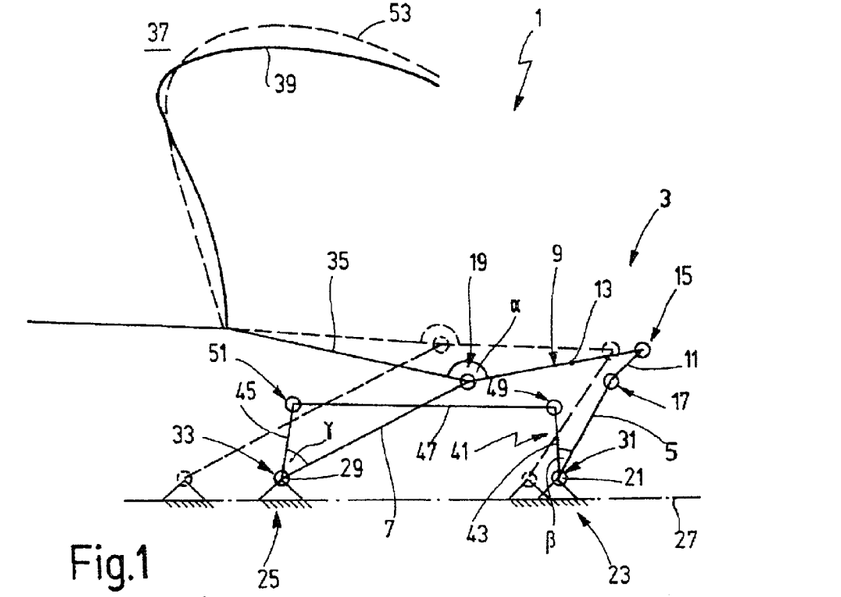
FIG. 1, a basic sketch of a portion of a first exemplary embodiment of the wiper system of the invention.

FIG. 1 schematically shows part of a first exemplary embodiment of the wiper system 1, which includes a wiper lever linkage 3 that has a first pivot lever 5, a second pivot lever 7, and a coupling element 9. The coupling element 9 is embodied in multiple parts and has a first coupling part 11 and a second coupling part 13, which are coupled to one another with the aid of a joint 15. The second coupling part 13 is markedly longer, in this exemplary embodiment multiple times longer, than the first coupling part 11.

The first coupling part 11 and the first pivot lever 5 are coupled in articulated fashion to one another via a joint 17, and the second coupling part 13 and the second pivot lever 7 are coupled in articulated fashion to one another with the aid of a joint 19. The first pivot lever 5, on its end region remote from the first coupling part 11, is coupled in a manner fixed against relative rotation to a first shaft 21 of a first bearing 23, so that upon pivoting of the first shaft 21 about its longitudinal center axis, extending perpendicular to the plane of the drawing in FIG. 1, the first pivot lever 5 is correspondingly pivoted along with it. Spaced apart from the first bearing 23, a second bearing 25 is provided, which—like the first bearing 23—is disposed stationary on a base 27, represented by a dashed line. The second bearing 25 has a second shaft 29, which is pivotably supported about its longitudinal center axis, and with which the second pivot lever 7 is connected in a manner fixed against relative rotation. Thus the shafts 21, 29 more or less form further joints 31, 33 of the wiper lever linkage 3, which has a total of five joints.

The wiper lever linkage 3 has a wiper arm 35, which is secured to the second coupling part 13 of the coupling element 9. The angle α between the wiper arm 35, which has an angled base body, and the second coupling part 13 is accordingly constant during a reciprocating-pivoting motion of the wiper lever linkage 3 and in this case amounts to approximately 55°.

A wiper element, not shown in FIG. 1, that can for instance have a rubber lip is mounted on the wiper arm 35 and can be pressed in a known manner against a window of the vehicle and displaced accordingly upon a reciprocating-pivoting motion of the wiper lever linkage 3. In the process a swept field 37 is swept, whose shape, disposition and size are defined by the reciprocating-pivoting motion of the wiper lever linkage 3. Only the lower edge 39 of the swept field 37 is visible in the view of FIG. 1; this edge has a curved course, but besides curved portions linear portions are also present, in which the wiper arm 35—viewed in the vertical direction—is lifted, or upon a reversal of the pivoting direction of the wiper arm 35 is lowered, or is displaced essentially in the horizontal direction.

The ratio between the lengths of the first and second coupling parts 11, 13 varies markedly. The first coupling part 11 that creates the stroke has a relatively short length, so that by its motion the least possible rotary motion is transmitted to the long second coupling part 13, because the result could otherwise be the destruction of the course of motion of the wiper lever linkage 3.

The wiper system 1 further includes a drive device 41 for the wiper lever linkage 3; all that can be seen in FIG. 1 of this drive device are a first drive crank 43 and a second drive crank 45. The first drive crank 43 is coupled in a manner fixed against relative rotation to the first shaft 21, with which the first pivot lever 5 is also connected. The disposition of the first drive crank 43 and the first pivot lever 5 on the shaft 21 is selected such that they are disposed facing one another in a pivoted position; because of the connection in a manner fixed against relative rotation between the first shaft 21 and the drive crank 43 and the pivot lever 5, the angle αβ between these parts is constant during a reciprocating-pivoting motion of the wiper lever linkage 3. The second drive crank 45 is disposed on the second shaft 29 at a position that is offset in terms of rotational angle from the second pivot lever 7 and is connected to the second shaft in a manner fixed against relative rotation. Because of this design, the angle γ between the drive crank 45 and the pivot lever 7 is also constant during a displacement of the wiper lever linkage 3.

The first and second drive cranks 43, 45 are joined to one another with the aid of a coupling member 47, which via a joint 49 is connected in articulated fashion to the first drive crank 43 a further joint 51 to the second drive crank 45. Because of the coupling of the two drive cranks 43, 45 to one another, precise control of the pivoting motions of the pivot levers 5, 7 is feasible in a simple way, as will be described in further detail hereinafter.

In FIG. 1, a dashed line represents a known four-bar wiper lever linkage, which likewise has first and second pivot levers that are joined together via a rigid, one-piece coupling element; the coupling element is connected to the pivot levers each via a respective joint. A wiper arm with a wiping element is also mounted on the four-bar wiper lever linkage, and upon a reciprocating-pivoting motion of the wiper lever linkage, this arm sweeps a swept field whose lower edge 55 is represented by a dashed line in FIG. 1. A comparison shows that the swept field of the five-bar wiper lever linkage 3 and that of the four-bar wiper lever linkage are essentially the same size; that is, the height and width of the swept fields are approximately the same. The wiper lever linkage 3 of the invention, however, requires markedly less installation space then the conventional four-bar wiper lever linkage, which is advantageous particularly when the wiper lever linkage 3 is disposed in the front-end region of a motor vehicle, since there is only little space available there to accommodate the wiper system 1. One reason for the compact design of the wiper lever linkage 3 is especially the lesser spacing of the first bearing 23 from the second bearing 25 for the wiper lever linkage 3, which is possible only because of the multi-part design of the coupling element 9.

Below, in conjunction with FIGS. 2 and 3, one exemplary embodiment each of the drive device 41 for the drive cranks 43, 45 will be described in further detail. Parts that have already been described in conjunction with the wiper system 1 shown in FIG. 1 are identified by the same reference numerals and so for their description, reference is made to the description of FIG. 1.

Figure 2:
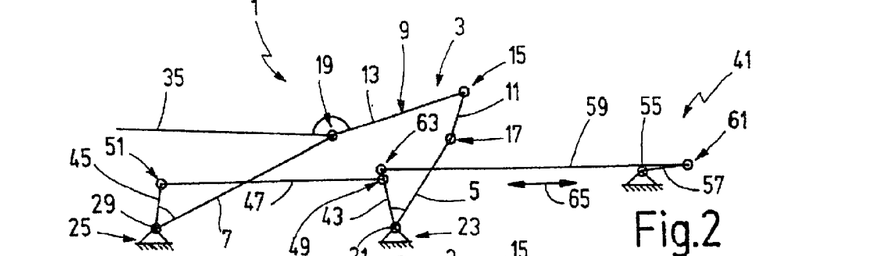
FIG. 2, a basic sketch of a first exemplary embodiment of a drive device for a wiper lever linkage.

The drive device 41 has a drive shaft 55, disposed in stationary fashion spaced apart from the bearings 23, 25 of the wiper lever linkage 3, preferably toward the middle of the vehicle, and the drive shaft can be subjected to a driving or braking moment and is rotatable about its longitudinal center axis extending perpendicular to the plane of FIG. 2. A transmission lever 57 is secured to the drive shaft 55 and rotates jointly with it upon a rotation of the drive shaft. The drive device 41, which in the exemplary embodiment shown in FIG. 2 is embodied as an in-line drive mechanism, also has an engine crank 59, which is connected in articulated fashion to the transmission lever 57 via a joint 61 and, on its other end region, to the first drive crank 21 via a further joint 63. Upon rotation of the drive shaft 55, the engine crank 59 is displaced back and forth in the direction of a double-headed arrow 65. Because of the coupling in articulated fashion of the engine crank 59 to the first drive crank 43, upon an oscillating motion of the engine crank 59 the drive crank 43 and, because of its coupling to the second drive crank 45 via the coupling member 47, the second drive crank 45 as well, are pivoted jointly about the first shaft 21 and the second shaft 29, respectively. Thus both shafts 21, 29 are driven.

Figure 3:
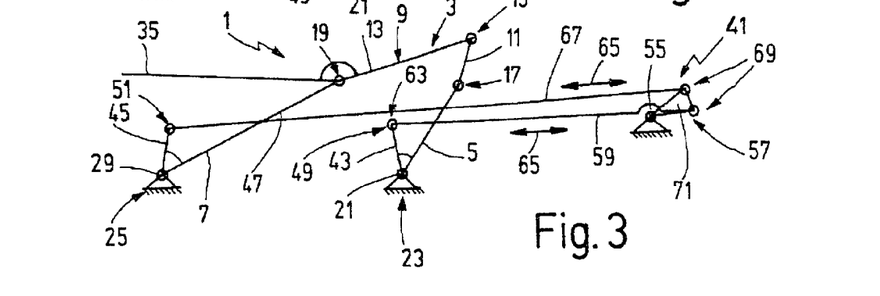
FIG. 3, a basic sketch of a second exemplary embodiment of a drive device.

In the exemplary embodiment of the drive device 41 shown in FIG. 3, a direct drive for the shafts 21, 29 is realized. Here, the drive cranks 43, 45 are not joined together via a coupling member 47 described in conjunction with FIGS. 1 and 2, but rather via engine cranks 59 and 67, of which the engine crank 59 is connected in articulated fashion to the first drive crank 43 by means of the joint 63, and the other engine crank 67 is connected in articulated fashion to the second drive crank 45, via the joint 51. In their end regions remote from the drive cranks, the engine cranks 59, 67 are each connected to one another in articulated fashion via a joint 69 by a transmission lever 57 formed by a triangular plate 71; the transmission lever 57 is connected to the drive shaft 55 in a manner fixed against relative rotation. Upon a rotation of the drive shaft 55 about its longitudinal center axis, the engine cranks 59, 67 are displaced essentially in the horizontal direction, oscillating in the direction of the arrows 65, and as a result the drive cranks 43, 45 and thus not only the shafts 21, 29 but also the first and second pivot levers 5, 7 connected to the shafts are pivoted in the corresponding direction.

The joints 17, 19 between the pivot levers 5, 7 and the coupling element 9 and the additional joint 15 between the coupling parts 11, 13, and preferably the joints 51, 61, 63, 69 of the drive device 41, are all, in an advantageous exemplary embodiment, embodied as cylindrical joints, whose pivot axes extend parallel to one another and preferably parallel to the first and second shafts 21, 29. In an advantageous exemplary embodiment, the joints of the wiper lever linkage 3 are embodied as separable shaft and hub connections that transmit moments. The cylindrical joints have high rigidity. It is understood that it is also possible for at least some of the joints to be embodied as ball joints.

The motion of the wiper lever linkages 3 of the wiper system 1 shown in FIG. 1 will now be described in further detail in conjunction with FIGS. 4A–4C; the wiper lever linkage is shown in a different position in each of these Figures. It can be seen that the wiper lever linkage 3 is driven by a drive device 41 as described in conjunction with FIG. 3.

Figures 4A, 4B:
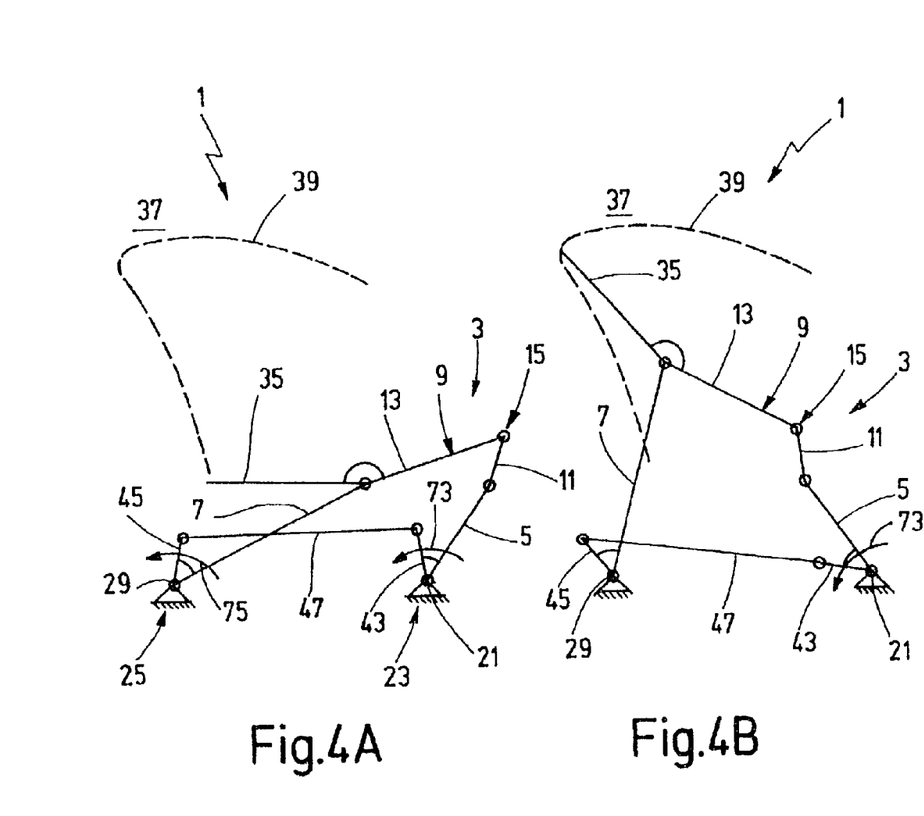
FIGS. 4A–4C, one exemplary embodiment of the wiper lever linkage in three positions.
Figure 4C:
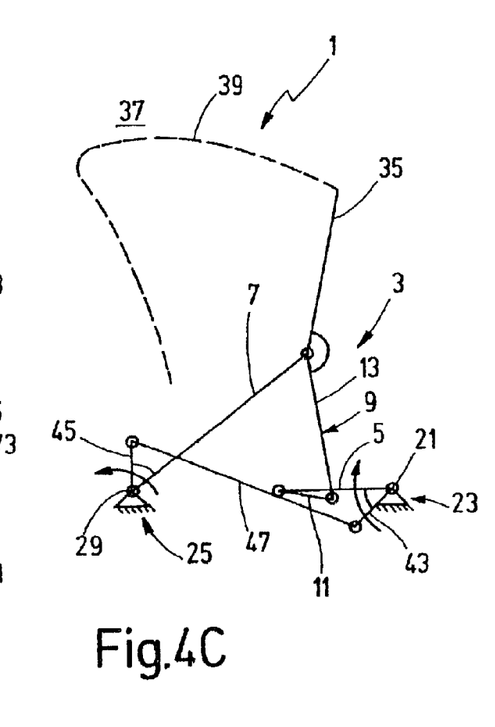

In the position shown in FIG. 4A, the wiper lever linkage 3 is in an outset position, in which the wiper arm 35 is disposed outside the swept field 37, preferably essentially parallel to an imaginary horizontal line. With the aid of the drive device 41, the first and second drive cranks 43, 45, which are connected to one another via the coupling member 47, are pivoted counterclockwise until they reach their position shown in FIG. 4B, as indicated by arrows 73, 75. In the position shown in FIG. 4B, the wiper lever linkage 3 is in an extended position, in which the coupling member 47 and the first drive crank 43 are aligned with one another. It can be seen that in this functional position, the first and second coupling parts 11, 13 are not in an extended position but rather are inclined relative to one another; hence jamming of the wiper lever linkage 3 can be practically precluded. In the extended position of the wiper lever linkage 3, the wiper arm 35 is disposed in a position in which it has attained its maximum stroke. A reversal of the pivoting direction of the second drive crank now takes place in the extended position of the wiper lever linkage 3; that is, the second drive crank 45 is now pivoted in the opposite direction, that is, clockwise, while the first drive crank 43 is pivoted onward counterclockwise (arrow 73). The drive cranks 43, 45 now have opposed pivoting directions, until such time as the wiper lever linkage 3 is displaced into the turning point position shown in FIG. 4C, at which position half of a wiping cycle has been completed.

In the turning point position of the wiper lever linkage 3, the wiper arm 35 is disposed at a slight spacing from an A pillar of the vehicle. To pivot the wiper arm 35 back into its outset position shown in FIG. 4A, the engine crank 59 shown in FIG. 2 is now displaced toward the right by a rotation of the drive shaft 55 in the same direction (FIG. 3). In the process, the first drive crank 43 is pivoted clockwise and the second drive crank 45 is pivoted counterclockwise, until they again reach the extended position shown in FIG. 4B, in which the coupling member 47 and the drive crank 43 are again aligned with one another. At the extended position, a reversal of the direction of rotation of the second drive crank 45 again takes place; this drive crank is now pivoted onward clockwise jointly with the first drive crank 43, until the cranks reach the turning point position shown in FIG. 4A. One complete wiping cycle has now been concluded.

Figure 5:
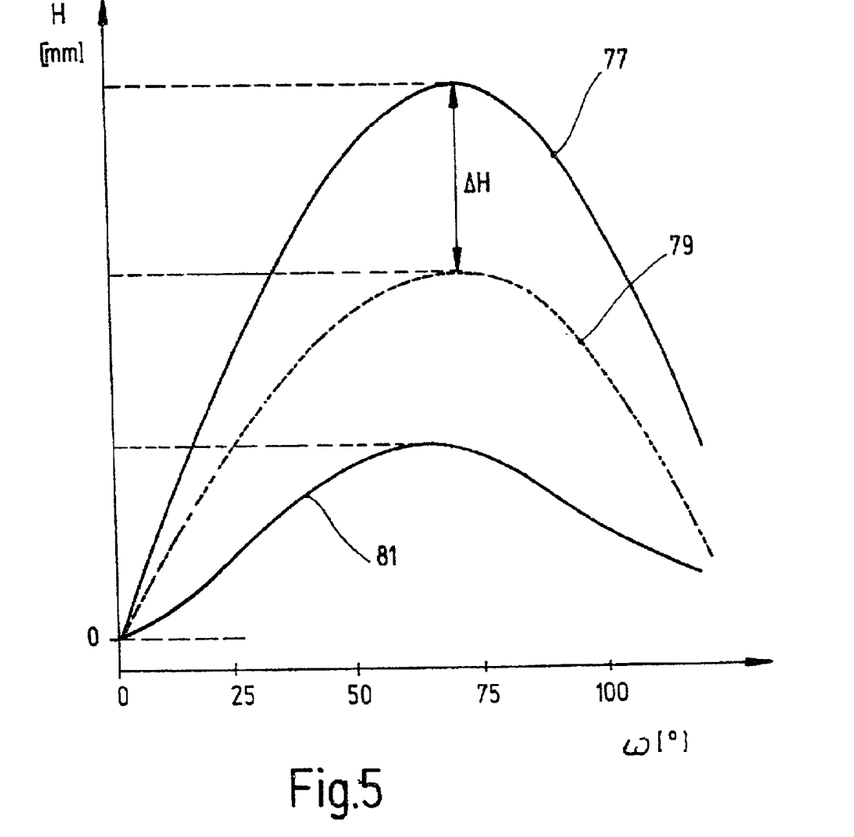
FIG. 5, a graph showing the stroke course of the wiper lever linkage during one wiping cycle.

FIG. 5 shows a graph in which the stroke H of a wiper lever linkage, of the type addressed here, is plotted on the ordinate, and the pivot angle omega of the first drive crank 43 is plotted on the abscissa. A curve 77 shown in FIG. 5 indicates the stroke course of the five-bar wiper lever linkage 3 described in the preceding drawings, which has the shape of a parabola, with the turning point of the parabola located approximately at ω=70°, which is equivalent to the extended position of the wiper lever linkage 3 in FIG. 4B. A curve 79 is shown in a dashed line, indicating the stroke course of a conventional four-bar wiper lever linkage. A comparison clearly shows that the maximum stroke of the four-bar wiper lever linkage is markedly shorter than that of the wiper lever linkage 3 of the invention, and the differential stroke ΔH is achieved by means of the two-part coupling element 9, whose stroke course is represented by a curve 81.

As FIG. 5 shows, the total stroke of the five-bar wiper lever linkage 3 is thus formed of two partial strokes. The first partial stroke is formed inside the coupling element 9, while the other partial stroke takes place between the pivot point (shaft 21), affixed to the frame, of the drive crank 43 and the coupling bearing point (joint 51) of the second drive crank 45. The sum of the two partial strokes is the total stroke of the five-bar wiper lever linkage 3. The kinematic design of the wiper lever linkage 3 is preferably selected such that the maximum of the two partial strokes occurs simultaneously, so that the largest possible total stroke is thus attained. It is also advantageous that the location of the maximum stroke of the wiper lever linkage 3 can be selected relatively freely, since the disposition of the site of the maximum stroke of each of the two partial strokes offers a plurality of combination options in which lever lengths or the locations of the pivot points of the joints are varied accordingly.

Figure 6A:
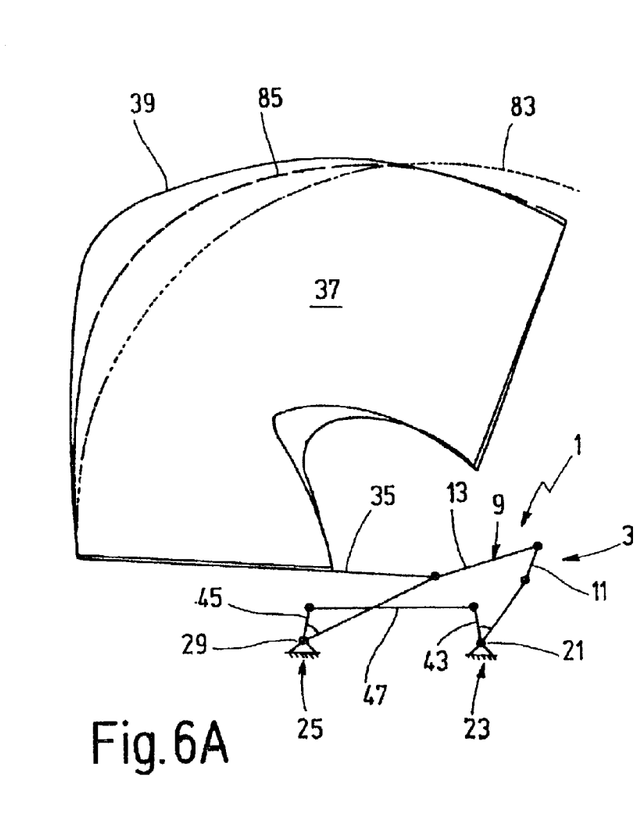
FIGS. 6A and 6B, a plurality of swept fields that can be achieved with the wiper lever linkage.

In FIG. 6A, an exemplary embodiment of the wiper lever linkage 3 is shown with which a swept field 37 is realized whose edge 39 is represented by a solid line. The edge 83 of a swept field, in the form of a partial circle of a known wiper lever linkage is shown that has an uncontrolled stroke; that is, its wiper arm is merely pivoted about a stationary shaft. The edge 83 accordingly has a circular shape with the center point of the pivoting axis of the wiper arm. FIG. 6A also shows a further swept field with an edge 85 that can be achieved with a known four-bar wiper lever linkage of the kind described in conjunction with FIG. 1. It can be seen that compared to the feasible stroke with the known four-bar wiper lever linkage—preferably at a substantially equal structural size—the stroke of the wiper lever linkage 3 of the invention is markedly longer. The large swept field means greater safety and comfort for a vehicle occupant.

Figure 6B:
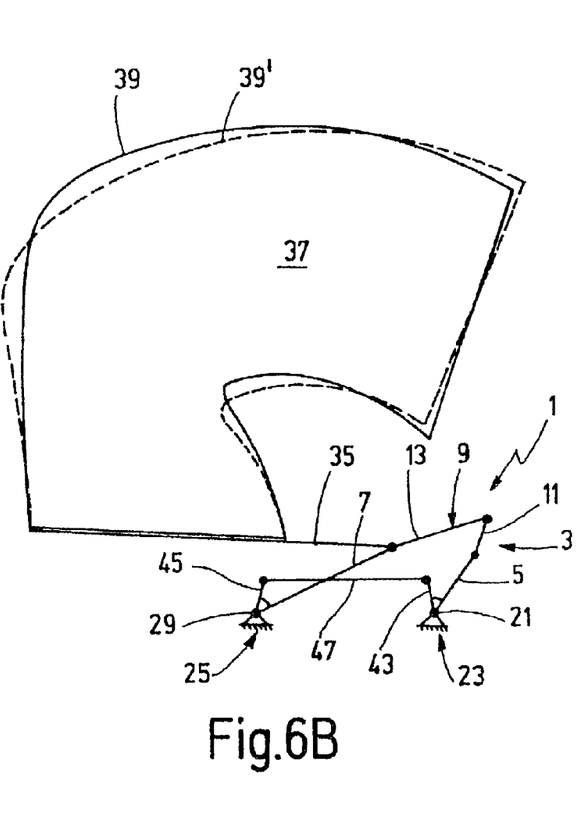

In FIG. 6B, other swept fields 37 with the edges 39 and 39', respectively, that can be achieved with the wiper lever linkage 3 of the invention are shown. To determine the geometry of the swept field 37, only the lengths of the pivot levers 5, 7, and of the coupling element 9 or the coupling parts 11, 13 and of the first and second drive cranks 43, 45 have to be suitably set or adapted to one another. In addition, by adapting a course of motion of the first and second drive cranks 43, 45 to one another, influence can also be exerted on the geometry of the swept field.

Figures 7, 8:
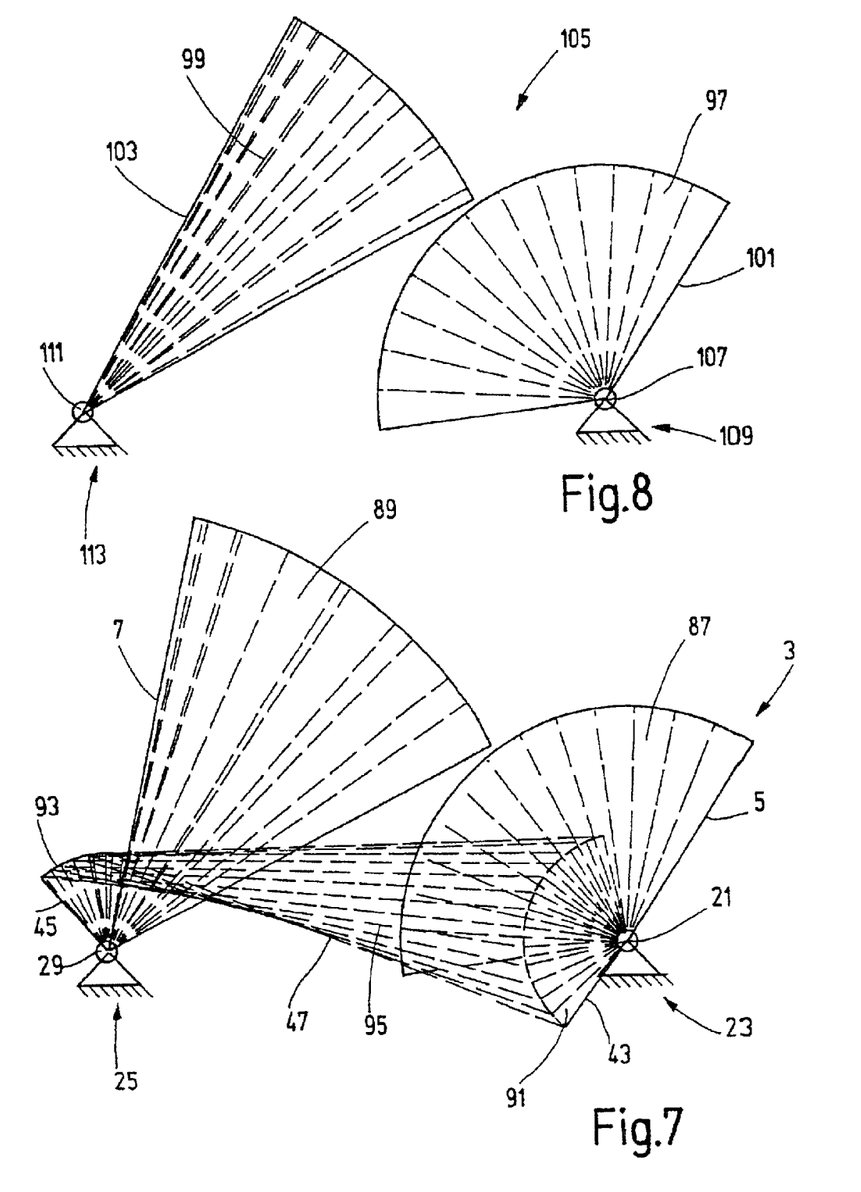
FIG. 7, pivoting ranges of drive cranks and of a coupling member connected to them in articulated fashion.
FIG. 8, the pivoting range of a first drive crank and of a second drive crank in a known four-bar wiper lever linkage.

FIG. 7 shows a detail of an exemplary embodiment of the wiper lever linkage 3 and of the drive device 41. In detail, the pivoting region 87 of the first pivot lever 5, the pivoting region 89 of the second pivot lever 7, the pivoting region 91 of the first drive crank 43, the pivoting region 93 of the second drive crank 45, and the pivoting region 95 of the coupling member 47 are shown. In comparison, FIG. 8 shows the pivoting regions 97 and 99 of first and second pivot levers 101 and 103 in the known four-bar wiper lever linkage 105. The pivot lever 101 is connected in a manner fixed against relative rotation to a shaft 107 of a stationary bearing 109, and the second pivot lever 103 is connected in a manner fixed against relative rotation to a shaft 111 of a second bearing 113. It becomes clear that the pivoting region 89 of the second pivot lever 7 of the five-bar wiper lever linkage 3 of the invention is markedly larger than the pivoting region 99 of the second pivot lever 103 of the known four-bar wiper lever linkage 105, while the pivoting region 87 of the first pivot lever 5 and the pivoting region 97 of the first pivot lever 101 are essentially the same size.

In summary, it can be stated that by means of the five-bar wiper lever linkage 3 described in conjunction with the preceding drawings, a markedly longer stroke and thus an enlarged swept field are feasible than with the wiper lever linkages described at the outset, and this can be attained by means of the coupling parts 11, 13 that are connected in articulated fashion to one another and to the first and second pivot levers 5, 7. A further advantage of the five-bar wiper lever linkage 3 is that the joint technology and preferably at least some parts of the drive device can be adopted from the known four-bar wiper lever linkage. The wiper lever linkage 3 has reduced gear ratios compared to the known wiper lever linkage, and as a result the kinematic quality of the mechanism is improved, and thus the motor attraction moment required for operation (the torque to be exerted on the drive shaft 55) is reduced. The wiper lever linkage 3 has a simple design, especially because complicated cross-angle mechanisms can be dispensed with.

It is also advantageous that the relative angles between the moving parts (first pivot lever 5 and first coupling part 11; second pivot lever 7 and second coupling part 13) of the five-bar wiper lever linkage 3 are markedly less than in a known four-bar wiper lever linkage. As a result, there is also less stress on the joints, and so smaller joints can optionally be used.

What is claimed is:

1. A wiper system for vehicles, having at least one wiper lever linkage that has at least one wiper arm 35 and that includes a first pivot lever 5, couplable to a stationary first shaft 21 in a manner fixed against relative rotation, and a second pivot 7 lever couplable to a stationary second shaft 29 in a manner fixed against relative rotation, the pivot levers being connected by a first coupling means embodied as a coupling element, the coupling element (9) is embodied in multiple parts and has a first coupling part (11) and a second coupling part (13), which are coupled to one another with the aid of a first joint (15), the at least one wiper arm (35) is secured to the second coupling part (13), the first coupling part is connected on its end opposite to the first joint (15) to the first pivot lever (5) via a second joint (17) and the second coupling part (13) is connected on its end opposite to the first joint (15) to the second pivot lever (7) via a third joint (19), characterized in that, the second coupling part (13) is longer than the first coupling part (11), and the first pivot lever (5) and the second pivot lever (7) are connected by a second coupling means in their swinging motion.

2. The wiper system of claim 1, characterized by a drive device (41) for the wiper lever linkage (3), which device includes at least one first drive crank (43) coupleable in a manner fixed against relative rotation to the first shaft (21) or the second shaft (29).

3. The wiper system claim 2, characterized in that the first drive crank (43) coupleable to the first shaft (21) in a manner fixed against relative rotation, and that the drive device (41) has a second drive crank (45) coupleable in a manner fixed against relative rotation to the second shaft (29).

4. The wiper system of claim 3, characterized by a coupling member (47), which joins the first and second drive cranks (43, 45) to one another and which is coupled to the drive cranks (43, 45) via a respective joint (49, 51), and that at least one engine crank (59) is connected in articulated fashion to the first drive crank (43) or the second drive crank (45).

5. The wiper system claim 3, characterized in that the first and second drive cranks (43, 45) are each connected in articulated fashion to a respective engine crank (59, 67).

6. The wiper system of claim 5, characterized in that the engine crank (59, 67) is displaceable transversely, or essentially transversely, to the first and second shafts (21, 29).

7. The wiper system of claim 1, characterized in that joints (17, 19) between the pivot levers (5, 7) and the coupling element (9) and the additional joint (15) between the coupling parts (11, 13) are embodied as cylindrical joints, whose pivot axes extend parallel to one another and preferably parallel to the first and second shafts (21, 29).

8. A method for operating a wiper lever linkage of a wiper system for vehicle, the wiper lever linkage having at least one wiper arm 35, a first pivot lever 5, coupleable to a stationary first shaft 21 in a manner fixed against relative rotation, a second pivot lever 7 coupleable to a stationary second shaft 29 in a manner fixed against relative rotation, a first drive crank 43 coupleable to the first shaft 21 in a manner fixed against relative rotation, a second drive crank 45 coupleable to the second shaft 29 in a manner fixed against relative rotation, a coupling member 47 connected in articulated fashion to the drive cranks, the pivot levers being connected by a first coupling means embodied as a coupling element, the coupling element (9) is embodied in multiple parts and has a first part (11) and a second coupling part (13), which are coupled to one another with the aid of a first joint (15), the at least one wiper arm (35) is secured to the second coupling part (13), the first coupling part is connected on its end opposite to the first joint (15) to the first pivot lever (5) via a second joint (17) and the second coupling part (13) is connected on its end opposite to the first joint (15) to the second pivot lever (7) via a third joint (19), the method having the following steps:

during one wiping cycle, the first and second drive cranks 43, 45 are first pivoted out of an outset position of the wiper lever linkage in the same direction until they are in an extended position, in which the coupling member 47 and the first drive crank 43 are aligned with one another;

next, upon a displacement of the wiper lever linkage out of the extended position into a turning point position, the first drive crank 43 is pivoted onward in the same direction and the second drive crank 45 is pivoted onward in the opposite direction;

providing the second coupling part 13 longer than the first coupling part 11, and connecting the first pivot lever 5 and the second pivot lever 7 by a second coupling means in their swinging motion.

9. The method of claim 8, characterized in that the pivoting motions of the drive cranks are dependent on one another.

* * * * *